United States Patent [19]

Sheathelm

[11] 4,129,186

[45] Dec. 12, 1978

[54] BEAN PULLER

[76] Inventor: Dorwin J. Sheathelm, 1336 Dietz Rd., Dansville, Mich. 48819

[21] Appl. No.: 734,733

[22] Filed: Oct. 21, 1976

[51] Int. Cl.² ............... A01D 31/00; A01D 55/00
[52] U.S. Cl. .................................................. 171/83
[58] Field of Search .................. 171/83, 62, 63, 64, 171/65, 104, 139, 140; 56/157, 327 R

[56] References Cited

U.S. PATENT DOCUMENTS

| 2,309,392 | 1/1943 | Roepke | 171/140 X |
|---|---|---|---|
| 2,521,417 | 9/1950 | Sefcovic | 171/65 |
| 3,393,501 | 7/1968 | Meyer | 56/157 X |
| 3,399,520 | 9/1968 | Porter | 171/62 X |
| 3,796,268 | 3/1974 | Porter | 171/88 |
| 3,918,243 | 11/1975 | Lemanski | 171/64 |

*Primary Examiner*—Hugh R. Chamblee
*Attorney, Agent, or Firm*—Miller, Morriss and Pappas

[57] ABSTRACT

A bean puller or harvester of the front end carriage mountable type and including driven cutting discs, the cutting discs running in a substantially horizontal plane and running slightly beneath the ground surface. The drive units run the discs in opposite adjacent rotational directions to urge the severed plants toward a windrow intermediate a pair of adjacent rows. The preferred drive is hydraulic for the discs and the preferred disc form is a scalloped type. Variances in adjustment and interval are available and gage wheels maintain a constancy or running depth for each of the discs. Drive units are supported in selected intervals on a horizontal mounting bar which may be raised and lowered independent of adjustments for running depth and tilt angle.

8 Claims, 11 Drawing Figures

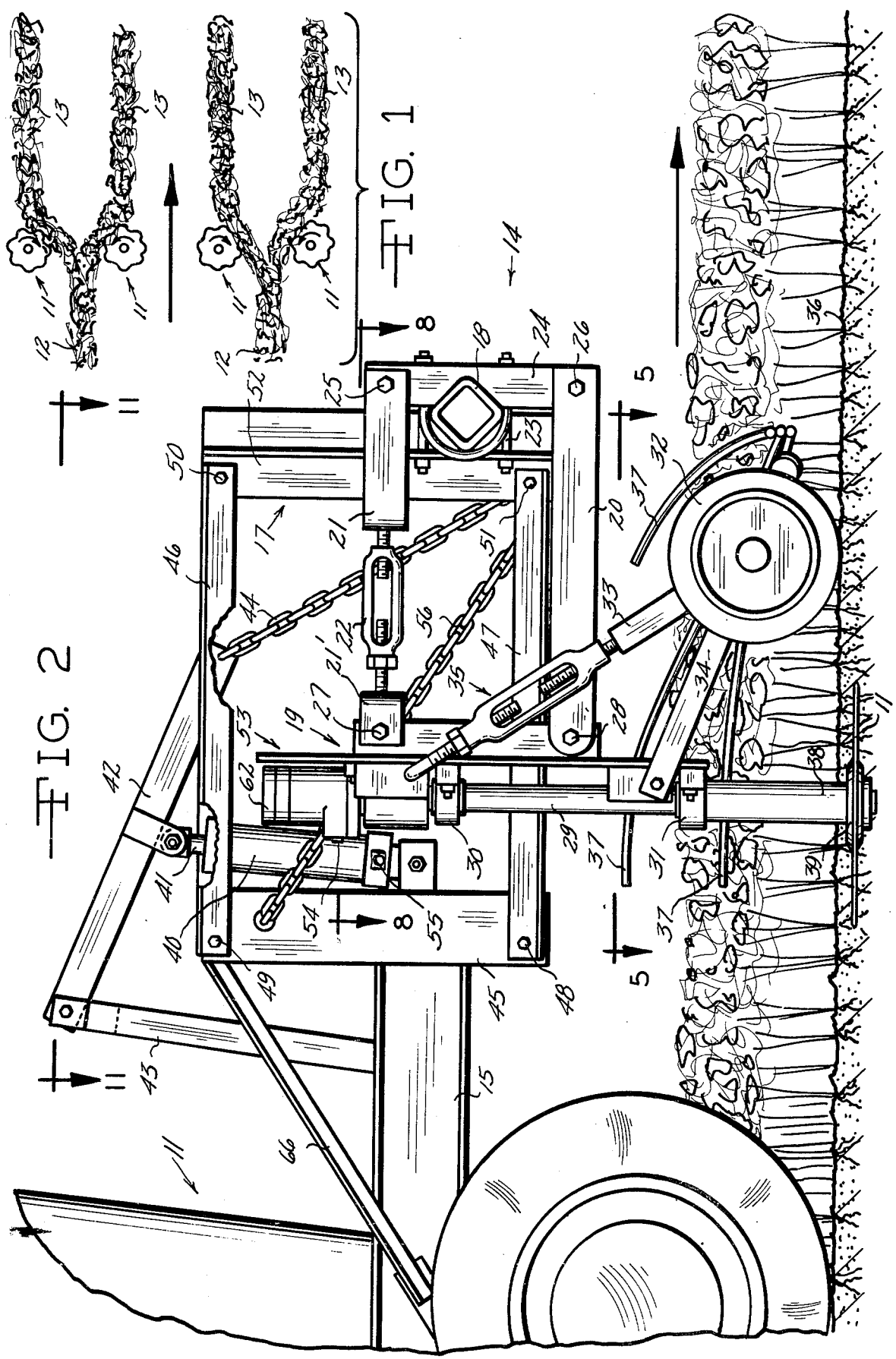

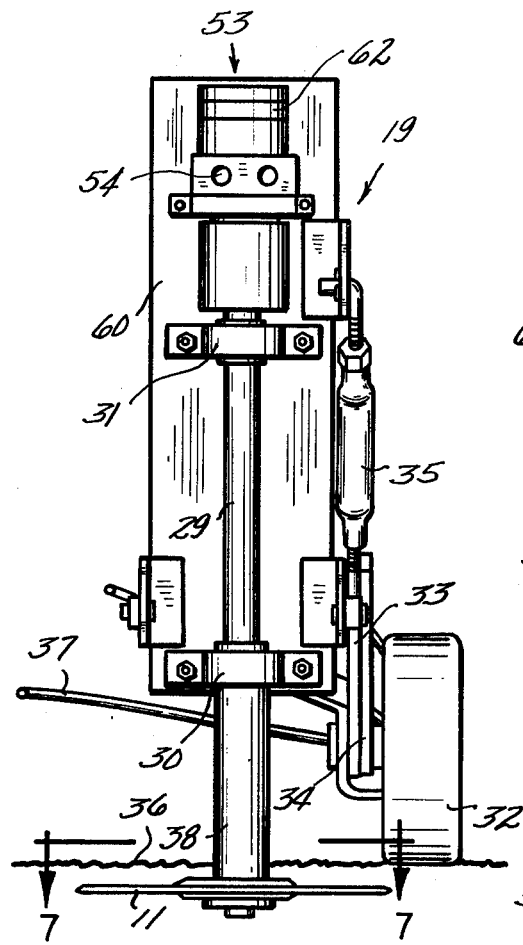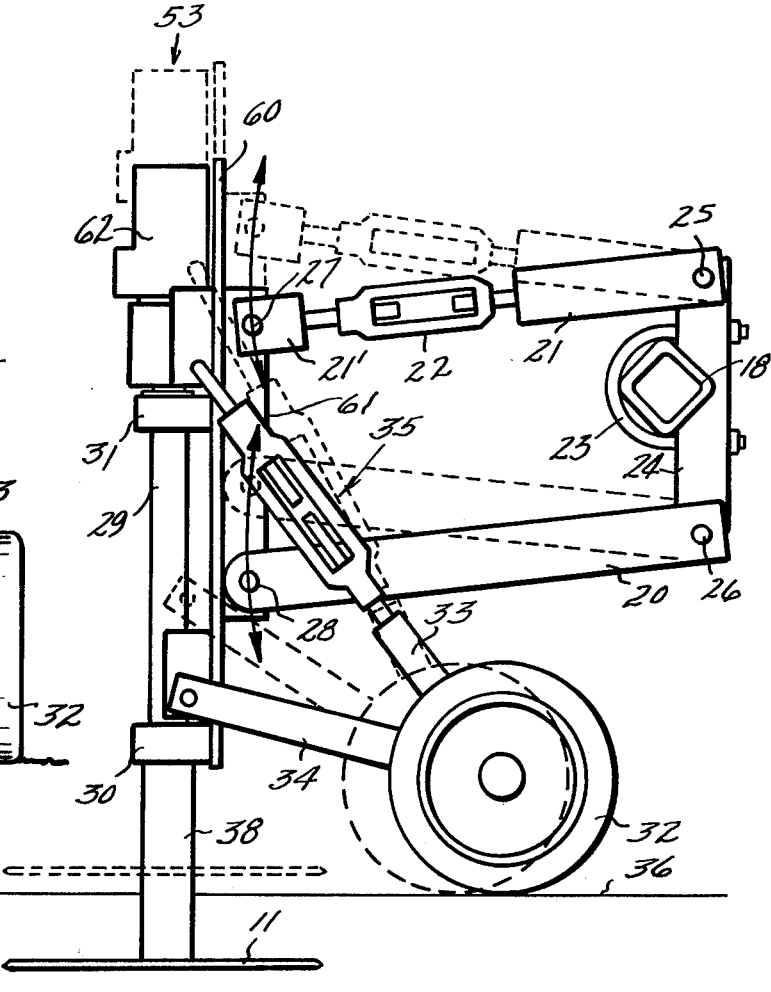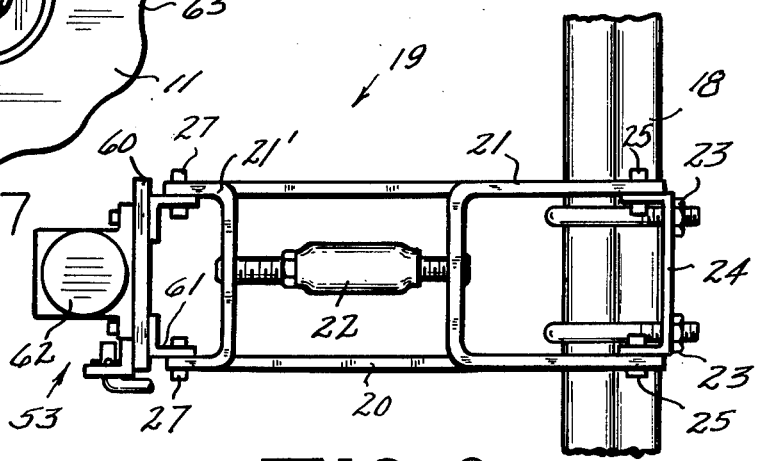

BEAN PULLER

The pulling or harvesting of beans is a somewhat delicate operation since the entire plant must be removed from the soil with a minimum of trauma to the bush portion of the bean plants so that the beans are not accidentally threshed from the pods by the action of the puller or harvester and the beans spilled on the earth. The removal must be smooth and gentle and should approximate a gentle sweeping action after separation of the plants from the earth. The present invention seeks to achieve improved harvesting without loss of beans and in testing the present structure has yielded improved results in smooth pulling and windrowing.

In the prior art it has been the practice to drag or push knife blades having substantial length through the earth beneath the beans so as to separate the bush portion of the beans from the major root structure thereby lifting the plants from the earth as gently as possible and then windrowing the severed plants for ultimate pickup by threshing equipment. The function of the knives was that of a static blade shearing at a point just below the earth surface to avoid dragging of the plants. Such devices are exemplified in the U.S. Pat. No. 3,800,879 to D. Chant, U.S. Pat. No. 3,190,361 to B. Lemanski, U.S. Pat. No. 2,614,379 to A. R. Madsen. Windrowing was achieved with rake fingers and the angular setting of the static blades. The greatest difficulty in using such devices has been to maintain proper adjustment since the blades are relatively long and narrow and tend to rise or plunge depending on the earth encounter and the shear line is relatively long making the structures difficult to hold at proper pulling depth.

Rotating blades in harvesters running beneath the surface characterize the principal contribution in the present invention. Harvesters and devices having horizontal rotating blades are known in the patent art as exemplified in U.S. Pat. No. 1,630,097 to H. O. Scranton for sugar cane and U.S. Pat. No. 2,580,721 to E. H. Beccard for a tree harvester. The U.S. Pat. No. 2,510,779 to J. E. Hancock is directed to a rotary bladed structure for terracing and ditching. These prior art rotary devices involve cutting cane or trees above the earth level or trenching while the new, useful and inventive structure of the present invention runs the horizontally oriented blades just beneath the soil or earth surface so as to separate root tendrils from the plant bush with minimal disturbance to the plants while physically and kinetically urging the plants of adjacent rows into a windrow.

Another object is to provide a powered bean puller head with rotating individually adjustable and gaged flat blades so as to better control the running depth and to provide substantial resistance to plunging or elevating of the blade.

Another object is to provide driven power blades which are bar mounted to the front of a tractor in plural groupings as desired so as to achieve the forming of plural windrows by running the adjacent blades on adjacent rows of beans and windrowing intermediate the blades. A collateral object is to provide independent drive units for each blade and to maintain compactness in the drive unit.

Another object is to improve depth stabilization by shortening the effective length of the blade and providing means to cant the blade from horizontal and to adjustably raise and lower the blades individually as monitored by a gage wheel within operating limits as desired.

Other objects including separate power (preferably hydraulic power) to each rotating blade and derived from the prime mover or tractor, debris elimination on the blades, simplicity of carriage mounting adjustment and maintenance will be best appreciated as the description proceeds. In observations from testing, the stable depth setting of each of the driven blades and the gentle windrowing achieved or initiated by the rotating blades seem to characterize the improved performance. Variances in blade speed are provided to suit particular ground and harvesting conditions. As contrasted with other types of commercially available bean pullers, less power seemed to be required for moving the structure through the beans.

IN THE DRAWINGS

FIG. 1 shows four rows of beans in plan view and indicating the advancing rotating discs. One driven disc per row is provided and the consequent two windrows of pulled beans is shown. The direction of disc rotation is indicated.

FIG. 2 is a side elevation view of a bean puller in accord with the present invention and shown mounted on the front of a tractor frame.

FIG. 6 is a front elevation view of the structure as expressed in FIG. 5.

FIG. 7 is a cross-section plan view taken on the line 7—7 of FIG. 6 and showing the anti-snarl tubular boot surrounding the drive shaft of the disc.

FIG. 8 is a top elevation view of the drive carriage and shows the simplicity of the push bar connection and the turnbuckle adjustment intermediate the drive carriage and mounting bar.

FIG. 9 is a side elevation view and indicating the nature of the turnbuckle adjustments of the drive carriage expressed in phantom line for vertical raising or lowering subject to gage wheel limitations.

GENERAL DESCRIPTION

Figure 3:
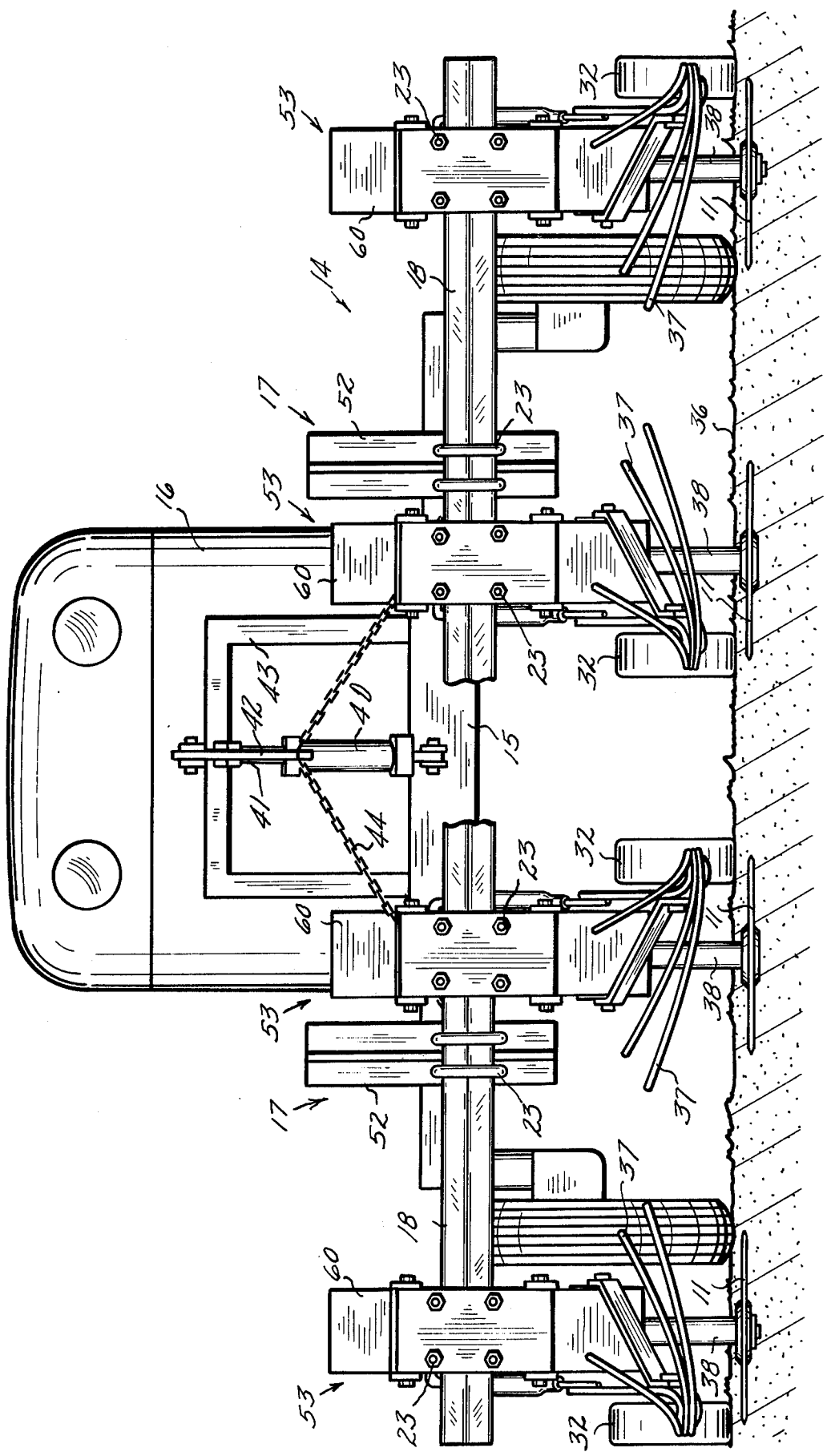
FIG. 3 is a front elevation view of the bean puller shown in FIG. 2 and indicating a four unit battery of drive units and driven discs.

In general, the present invention is a bean puller or a harvester and the principal unit of the harvester is a plurality of driven and horizontally disposed flat blades. The blades are suitably journalled in shafting carried in a generally vertical axis position and the motor drive for the blades is attached drivably to the shafting. The blade is preferably scalloped at the perimeter edge and over the hub connection to the shafting is a tubular boot which extends up the shaft to the lower bearing or journal. The boot does not rotate with the rotary blade. The motor is connected via suitable controls to a source of power, for example, a generator if electric power is used or a pump if hydraulic power is employed. The drive speed is preferably variable and speed reducers may be employed if necessary. The rotational speed of the blades are individually controllable to accommodate particular earth or plant conditions encountered. Thus it will be appreciated that it is preferred to have individual motors for each blade. The motors and shafting with suitable journalling are mounted in individual frames made up of structural elements. The motor frames are attached to an adjusting linkage and to a gage wheel. The combination mounting is a drive unit and plural of these units are mountable, one unit serving each row in selected spacing intervals established by the row intervals. The adjusting linkage has a fixed side which is selectively secured to the horizontal mounting bar. The mounting bar is secured to and is a part of the push carriage which is attached rigidly to the frame part of a tractor at the front end thereof. A lift structure, preferably, an hydraulic cylinder permits the push carriage to be elevated as desired. As will be appreciated, the structure involves an inner adjustable frame of the parallelogram type and an outer lift frame of the parallelogram type. The blades, limited to the running depth set by the gage wheels are all individually powered and are effectively secured on the mounting bar in intervals as dictated by the rows of beans, peas, or the like. Windrowing tines extend from the gage wheel in a rearwardly and sideward fashion urging the plants as they are pulled toward windrow position. Engagement with the plants is substantially simultaneous with the severance of the plant at the rotating blade. Usually the blade in each power unit is centered on a row of beans or peas and the next adjacent unit is centered on the next adjacent row so that as the puller progresses a windrow is formed intermediate the two rows of beans and spaced so that the tractor straddles the windrow or the windrows are cast outboard of the tractor wheels. Adjacent units are oppositely turned and each blade in each pair of units is rotated toward the windrow being formed. The blades run just beneath the surface of the earth and each power unit is depth adjusted by the gage wheel as the terrain makes this essential. In testing up to four units as herein described have been operated from the mounting bar on a single tractor. The invention contemplates plural puller heads or drive units in any selected interval (determined usually by the row separation) so long as there is adequate power to propel the structure. The rotating horizontal blades tend to reduce the resistance to forward movement and in general less power is required for pushing the bar than in previously known structures. Impact of the puller units with obstructions as boulders and submerged stumps can cause stoppage but in general the operator can foresee the problems and adjust to meet the encounter as by elevating or canting the blade. Downtime required in prior art devices for repair or sharpening of blades is substantially eliminated in the present structure, and for the most part, the disc-like blades remain continuously sharp and in operating condition for substantially improved lengths of time. The scalloped disc blades are generally preferred over the round discs but even the smooth discs, under power, operate satisfactorily. Broken discs or blades are extremely rare and replacement is relatively simple. Since the structure is pushed by the prime mover or tractor, it is very easy to trail the tractor with a threshing and shaking machine without major difficulty in connections.

SPECIFIC DESCRIPTION

Referring to the drawings and with specific reference first to the FIG. 1 thereof, the somewhat schematic presentation of the powered rotating discs 11 is clearly understandable. The discs 11 are moved horizontally against the roots of the plants such as beans in a plane substantially parallel with the plane of the blades or discs 11. Adjacent discs 11 rotate in an opposed sense and each pair urges the beans or peas toward a common windrow 12 between the rows 13. The large arrow indicates direction in which the discs 11 are simultaneously pushed and the small curved arrows on the discs 11 indicate the drive direction of the individual discs or blades 11. The discs or blades 11 may be set to run at a slight selected angle to horizontal.

In FIG. 2, bean puller 14 of the present invention is seen from the side and is mounted to the frame extension 15 at the front of the tractor 16. The principal box carriage 17 carries the horizontal mounting bar 18 and the drive unit or drive frame 19 is clamped in selected interval position on the mounting bar 18 by means of movable sets of arms 20 and 21-21', the latter being extendable and contractible as by means of the turnbuckle 22. The clamp 23 supports the vertical fixed arm 24 to the horizontal bar 18. This arrangement, as will be seen, utilizes the pivots 25, 26, 27 and 28 to permit lifting or lowering motion in the drive frame 19 while maintaining parallel alignment of shaft 29 with the fixed arm 24. The turnbuckle 22, as will be seen, permits the deviation of the drive frame 19 and shaft 29 from vertical thereby canting or tilting the horizontal disc-like blade 11.

The upper and lower bearings 30 and 31, respectively, provide journal support for the shaft 29 and the bearings 30 and 31 are secured to the frame 19 and are aligned with the drive means 62. The drive means 62 is for the rotation of the blade 11 in a substantially horizontal plane such as by the hydraulic motor shown. The bearings 30 and 31 are of the anti-friction pillow block type and are preferably sealed against the intrusion of dust and debris. The motor frame 19 also supports the depending gage wheel 32 by the adjustable strut 33 and fixed but pivotal strut 34. The adjustable strut 33 is made extendable and contractible by means of the turnbuckle 35 intermediate the ends of the strut 33. As will be appreciated, the location of the gage wheel 32 determines the running elevation of the disc blade 11 and in working position the running elevation is set just beneath the surface of the earth and the surface level 36 is sensed by the engagement with the gage wheel 32. The strut 34 provides a frame with the strut 33 for the wheel 32 and also supports the elongate curved tines or sweeps 37 welded thereto and bent or fashioned to run rearwardly and inwardly over the blade 11 so as to sweep the severed bean or pea plants gently into a windrow 12 as shown in FIG. 1. In general, as the gage wheel 32 is lowered, the blade 11 is relatively lifted and as the gage wheel 32 is lifted the running depth of the blade 11 is increased. Hence the gage wheel 32 moves the frame 19 as it is adjusted. The tractor 16 pushes the bean puller 14 in the direction of the large dark arrow directly above the row of plants 13.

Below the lower bearing 31 and jacketing the extension of the shaft 29 is a tubular sleeve or boot 38 which extends downward from the bearing to the hub portion 39 of the disc blade 11. The boot 38 does not rotate with the shaft 29 so that plant debris does not become wound on the shaft 29 and foul the operation.

The FIG. 2 is also helpful in understanding the use of the lift cylinder 40. The piston 41 of cylinder 40 is extendable and as it is extended the lift beam 42 pivotally pinned to the upright support 43 at one end and to the chain 44 on the other end lifts the chain 44 and the carriage. The chain 44 is secured to the box frame or carrier 17 and as the chain 44 and beam 42 is lifted, this lifts the horizontal bar 18 and all associated drive frames 19 and discs 11 in a line substantially parallel to the fixed substation vertical box frame element 45 in the manner of a parallelogram. The horizontal elements 46 and 47 pivot at points 48, 49, 50 and 51 and the movable end member 52 of the box frame 17 being rigidly secured to the horizontal mounting bar 18 and plural of the driven units 53 secured thereto at selected intervals spaced to accommodate the pulling of rows 13. What is formed in this manner is a pair of parallelogram frames, the inner frame 20-21 and 24 acting on the drive units 19 and the outer frame with elements 46 and 47 lifting with the entire assembly.

By means of the cylinder 40, the entire carriage, including the plural discs 11, is lifted clear of the ground and can thus be turned as desired with the tractor 16. While the controls are no part of the present invention, it will be appreciated that hydraulic leads are suitably connected to an hydraulic pump which may be integral with the tractor 16 and by proper valving the hydraulic actuation is manually controlled by the tractor operator. The hydraulic connections 54 are shown leading to the rotating motor 62 and the entry 55 provides hydraulic connection to the cylinder 40. The chain 56 is a movement limiting chain fixed at the upright element 45 and taut (as seen in FIG. 2) in prevention of the box frame 17 dropping beneath the limit point. This is adjustable as desired. Where it is desired that slack be left in the chain 56 then a shock spring is useful fully extended at the taut condition and providing a resilient bias to the slack chain 56. This is desirable in some moist grounds and is not illustrated except that it is clear that where slack is in the chain 56 it is sound practice to pick up the slack. The chain 56 is provided for each power or drive unit 53. The chain 44 acts on the entire bar 18 and connected carriage and locks the carriage to any desired height.

The mounting of the plural driven units 53 in spaced relation is best appreciated by reference to the FIG. 3 where the plural disc blades 11 are shown in selected spaced array mounted via their adjusting frames 17 to the horizontal mounting bar 18. The tines 37 working from the struts 34 of the gage wheels 32 are seen functioning to achieve windrowing between adjacent driven units 53, as shown.

Figure 4:
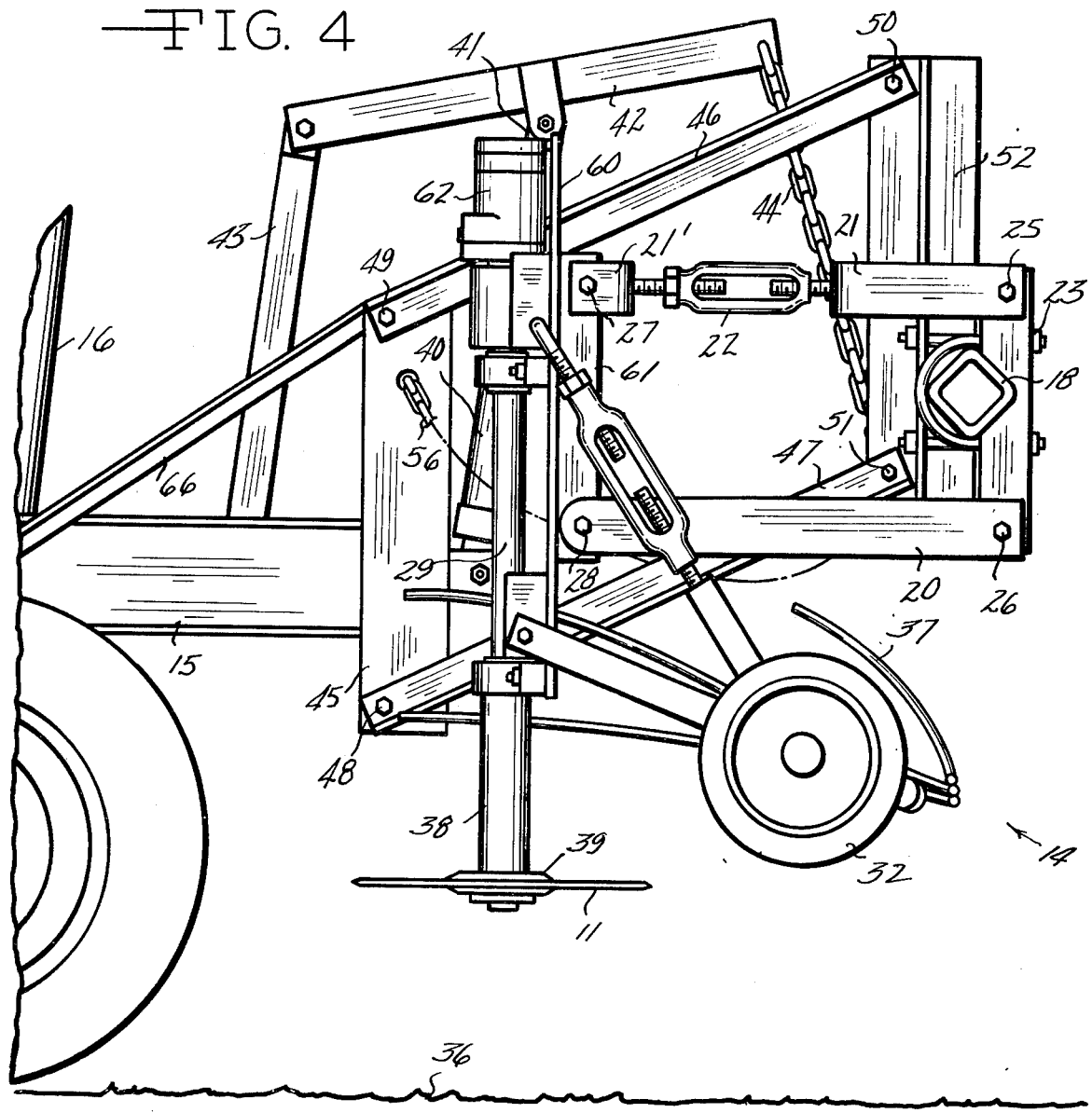
FIG. 4 is a side elevation view of a structure in accord with the present invention mounted on the front of a tractor and in lifted position.

The FIG. 4 shows the entire structure elevated by extension of the piston 41 in the cylinder 40 so that the chain 44 lifts the horizontal mounting bar 18 and the beam 42 of the attached structure is pivotal on the upright tractor frame member 45 in a vertical manner clear of the earth surface 36. The chain 56 is observed as slack from its prior taut limiting position and its limiting function is thus best understood.

Figure 5:
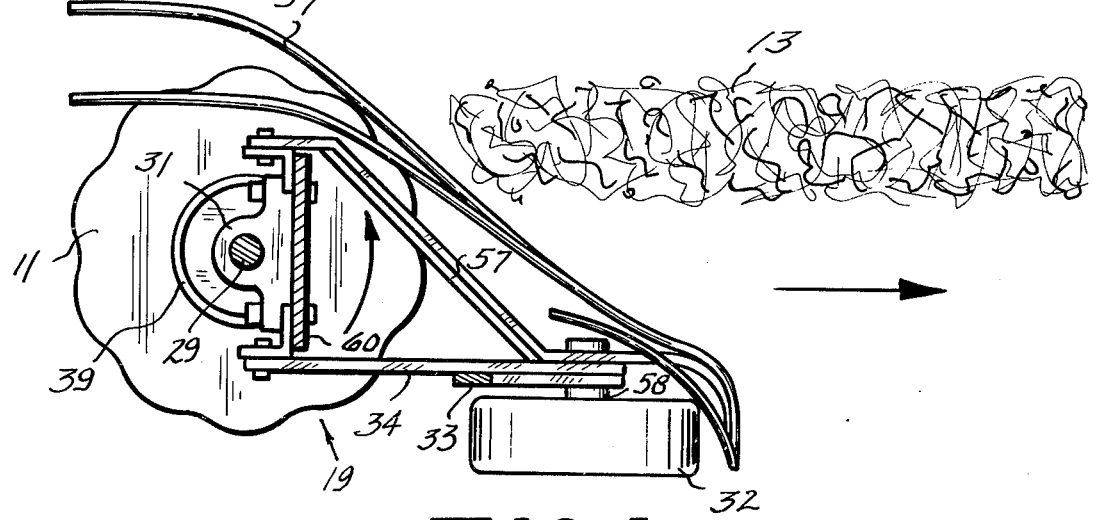
FIG. 5 is a partial plan view of one of the driven disc units and indicating the operational aspects of the disc.

The FIG. 5 indicates the preferred plan orientation of the discs 11 in respect to the row of beans or peas 13. The drive frame 19 supports the bearing 31 and in turn the shaft 29 which is operable secured to the motor 62 (FIG. 2) and the turning direction of the disc 11 is counterclockwise, as shown, casting the debris gently toward the sweep of the tines 37 for windrowing. On the other side of the windrow a disc 11 is rotating in clockwise fashion while progressing in the same forward sense as expressed by the dark arrow in the FIG. 5. The tines 37 on the other side of the windrow 12 also achieves a gentle gathering by pushing of the severed plants. The struts 34 and 33 are better appreciated in support of the gage wheel 32 and the diagonal bracing 57 is clearly visible in support of the strut shaft 58 of the wheel 32. The FIG. 5 also best expresses the preferred scallop type of horizontal disc blade 11.

In FIG. 6 the drive unit 53 comprising the drive frame 19, the journals 30 and 31, the shafting 29 and the drive means or motor is best illustrated from the tractor side and to which is adjustably connected the gage wheel 32, the struts 33 and 34 and the tines 37. The boot 38 covers the shaft 29 as it extends downwardly to connection with the disc 11. As previously indicated, the tines 37 can be bent to suitably chisel the sweeping or windrowing of several plants. The disc 11 is shown in operative position slightly below the ground level 36. The frame 19 includes the base plate 60 which provides mounting means for the journalling drive and shafting. As will be seen, the base plate 60 is backed up by structural angles forming a mounting channel 61 and the channel 61 is pivotally supported by the parallel arms 21 and 20. One of the arms is adjustable as to length and in the simplest form the arm 21-21' comprises a pair of structural yokes as will be seen and the elements 21-21' are connected by the turnbuckle 22. FIG. 7 is helpful in illustrating the clearance of the tubular boot 38 in respect to the shaft 29 and it is seen located between the hub 39 and the lower bearing 30 (FIG. 6). The scallops 63 around the perimeter of the disc 11 seem to provide improved performance in the disc 11 as it moves horizontally through the earth and in retention of a good and effective cutting edge.

In FIG. 8 the attachment of the drive unit 53 to the horizontal mounting bar 18 is best appreciated and the fixed vertical element 24 is shown changed by the clamps 23 to the bar 18. By loosening the clamps the drive units 53 and the frames 19 are selectively locatable on the bar 18 at desired intervals. The FIG. 9 assists in appreciating the vertical parallelogram movement of the drive units 53 by adjustment of the gage wheel 32 and consequent pivoting on the pivots 25, 26, 27 and 28. This is shown in phantom line with relative movement of the blade 11. As will be appreciated, there is a slight forward displacement of the drive unit 53 as the arms 20 and 21-21' deviate from horizontal but this is negligible and the important aspect is in the rise of the blade 11 in a relatively vertical manner parallel to the verticality in the member 24.

Figure 10:
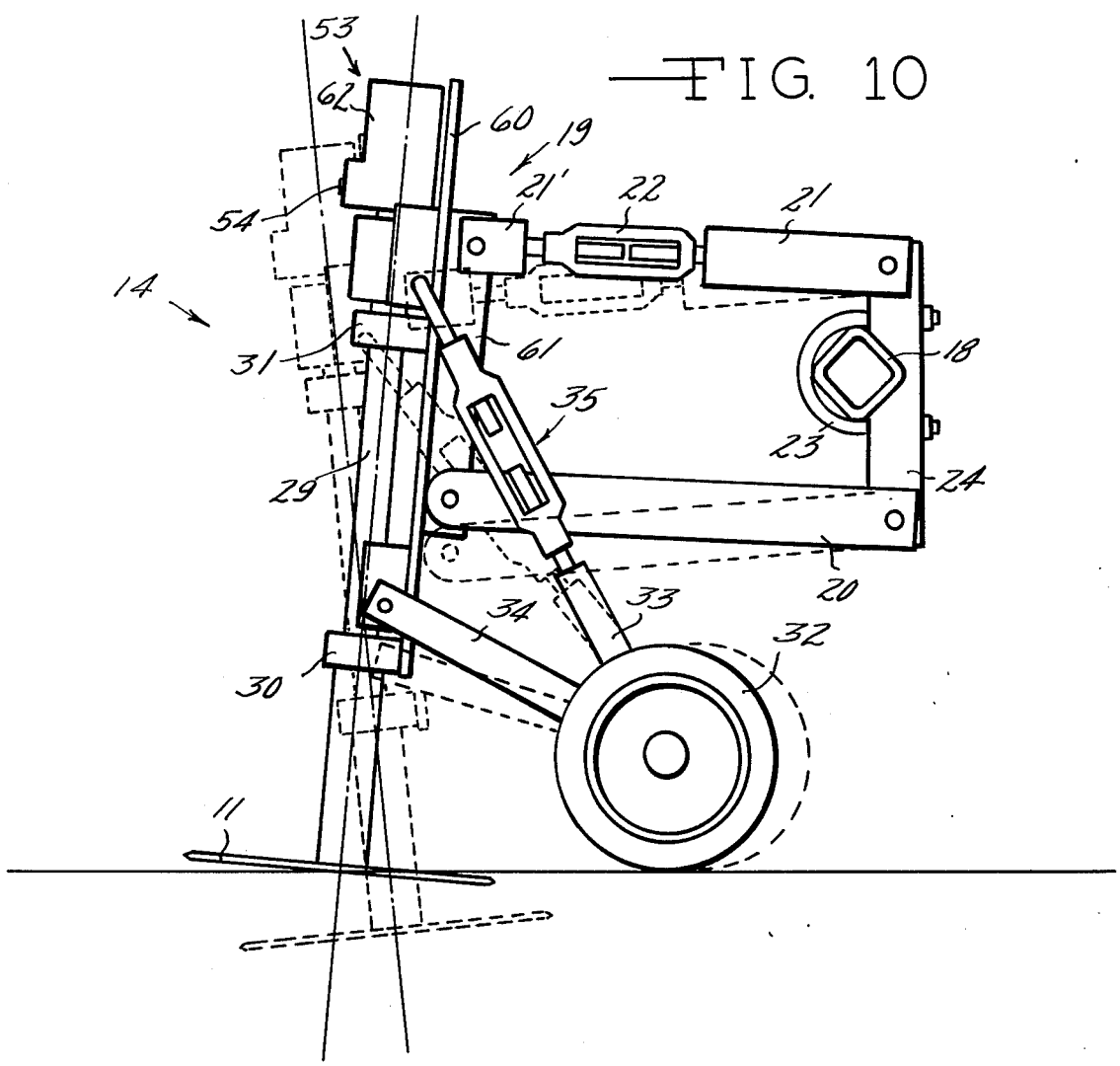
FIG. 10 is a side elevation view of the present invention and indicating the angular displacement or tilt of the driven disc.

In the FIG. 10 the canting of the drive unit 53 and frame 19 is by adjustment of the upper arm 21-21' by manipulation of the turnbuckle 22. This changes the axis of the shaft 29 from vertical, as shown, in both extremes of travel of the turnbuckle 22. The turnbuckle 35 can adjust the elevation as expressed in the FIG. 9 by repositioning the gage wheel 32 and the consequence of both is a compound field adjustment.

Figure 11:
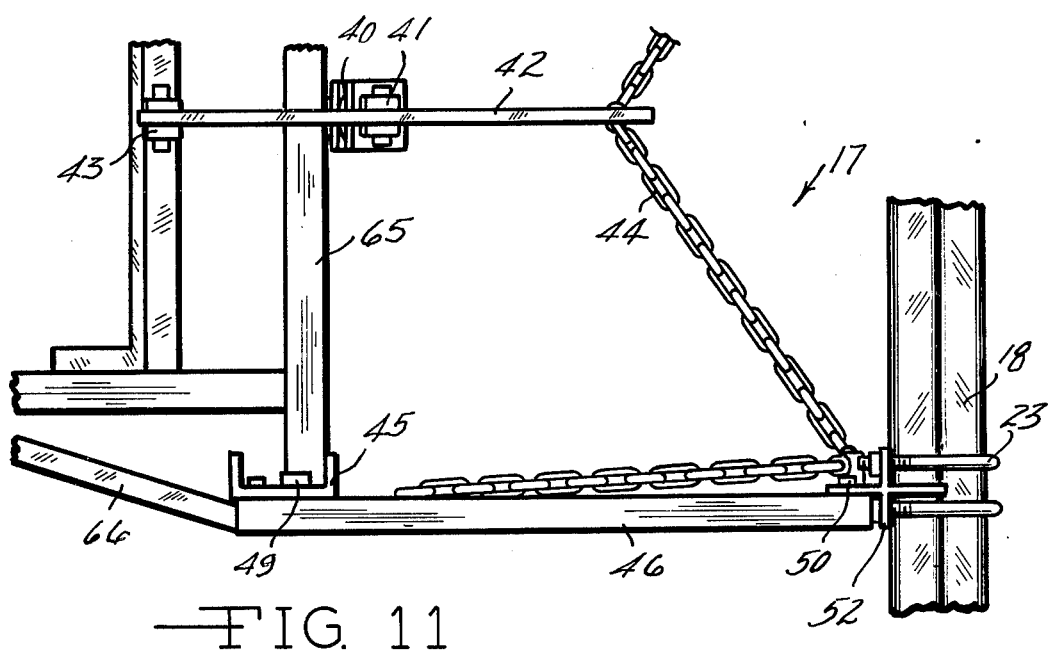
FIG. 11 is a partial plan view of the support carriage of the present invention and indicating a chain limiting support for the carriage.

FIG. 11 is of principal importance in relating the FIGS. 4 and 2 by indicating the outer box carriage 17 which lifts and carries the horizontal mounting bar 18. The cross brace 65 is visible bridging between the tractor frame extensions 15 and providing mounting means for the vertical channel box frame elements 45 and braced in fixed position by the diagonal angle strut 66.

The pivots 49 run through the member 45 in pivotal support of the upper horizontal arm of the outer box frame 17 and the horizontal arm 46 extends forwardly to pivotal connection with the fixed post 52 secured to the horizontal bar 18, the clamp 23. As many verticals 52 as necessary are provided on the bar 18 and are clamped thereto. These support the pivots 50 and 51 so that the bar 18 may be raised or lowered in accord with the motion imparted to the beam 42 by the cylinder 40 and piston 41 (FIG. 2). The cylinder 40 is supported by the cross element 65 as described. The beam 42 serving the entire bar 18 and structures mounted thereto lifts or lowers the chain 44 and the ends of the chain are secured to the elements 52 below the bar 18.

As thus described, a new and inventive bean puller combination is provided having plural drive heads 53 mounted on a common bar 18 and adjustable as to entry angle and as to operating elevation and the relationship of rotating blade 11 to earth surface is maintained by the individual gage wheels 32. The drive head 53 is new and with its adjusting features is capable of being mounted on various carriage supports but the described support is preferred. The preferred carriage (inner and outer) minimizes weight without sacrificing rugged dependability. Since each drive unit 53 on drive frames 19 are individually gaged, there is excellent performance over a high plurality of rows 13 served. The uniformity of performance in the field under varied ground conditions was noted in testing and in general longer performance runs without downtime for breakage or part failure was observed. Testing with variable speed on the discs has failed to produce an optimum range for performance since this also depends on the type of earth or ground and the running depth. Using the powered discs in testing one valid observation was that the power requirements in the tractor for pushing the unit seemed substantially less than for equivalent commercial bean pullers. Collaterally, the action of the rotating discs materially improved windrowing without threshing and consequent ground loss of beans.

Having described my invention and in particular a specific embodiment thereof, those skilled in the art will perceive changes, improvements and modifications within the skill of the art and such changes, improvements and modifications are intended to be included herein limited only by the scope of my hereinafter appended claims.

I claim:

1. A powered bean puller drive element for propulsion by a prime mover such as a tractor comprising:
   a horizontal rotating disc;
   a drive shaft drivably secured to said disc;
   top and bottom bearings in aligned support of said shaft;
   a motor drivably connected to said shaft;
   an elongate drive frame supporting said motor, said bearings and said shaft and for selectively tilting said disc, said drive frame is movable vertically in a parallelogram inner box frame and an outer parallelogram box frame, each having four pivot points and each having one side in fixed relatively vertical relation;
   a gage wheel adjustably supported by said drive frame and vertically establishing the running depth of said horizontal disc; and
   framing means connectable to a prime mover and independent of said gage wheel and connected to said drive frame for elevation of said drive frame and disc.

2. The combination of claim 1 in which said inner box frame has one side which is adjustable as to length between pivots.

3. In the structure of claim 2 wherein said inner and outer frames are fixedly attached at one end to a mounting bar and said mounting bar being in horizontal orientation and connected to lift means whereby both inner and outer frames are selectively lifted and lowered on said bar.

4. The structure as expressed in claim 3 in which plural of said rotating disc elements are positioned in spaced adjacent parallel positions;
   a mounting bar horizontally disposed and to which said rotating disc elements are clamped and said motors rotating said discs in opposition to the rotational direction of the next adjacent of said motors; and
   tines secured to said disc elements adjacent said gage wheels and said tines adjustably trailing said rotating discs.

5. A bean puller adapted to be front end mounted on a tractor or other prime mover comprising:
   a horizontal mounting bar supported by two parallelogram frames, one of said frames being an inner frame and one of said frames being an outer frame and both of said frames secured to said mounting bar, the innermost of said frames being repeated and plurally mounted on said horizontal bar at selected intervals;
   a plurality of drive elements each secured to a drive frame and each rotatably driving a horizontally positioned disc and each of said drive elements supported by said innermost frame whereby said drive element is selectively moved up and down;
   a lift structure operably connected to said tractor structure and operably connected to said horizontal bar whereby said horizontal bar is selectively movable vertically including said inner and outer frames, both pivotally connected to said bar;
   an adjustable length arm on said inner frame;
   an adjustable gage wheel depending from each of said drive units; and
   tines trailing said gage wheel and secured to said drive frames, said tines being adjustable for rearward sweep.

6. The structure in claim 5 wherein said driven disc is scalloped.

7. The structure in claim 5 wherein means are provided in prevention of said gage wheel dropping beneath a limit point.

8. The structure in claim 5 wherein said drive elements are hydraulically powered to turn said discs horizontally.